(12) United States Patent
Behrens et al.

(10) Patent No.: US 7,823,837 B2
(45) Date of Patent: Nov. 2, 2010

(54) TWO PART SPACECRAFT SERVICING VEHICLE SYSTEM WITH ADAPTORS, TOOLS, AND ATTACHMENT MECHANISMS

(75) Inventors: John W. Behrens, Torrance, CA (US); Thomas L. Kessler, Palos Verdes Estates, CA (US); Leora Peltz, Pasadena, CA (US); Jeffrey J. Cronick, Hunting Beach, CA (US); Glenn N. Caplin, Manhattan Beach, CA (US); Frank O. Chandler, Huntingdon Beach, CA (US); Robert V. Frampton, Pasadena, CA (US); Daniel E. Rivera, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 844 days.

(21) Appl. No.: 11/394,743

(22) Filed: Mar. 31, 2006

(65) Prior Publication Data

US 2007/0228220 A1    Oct. 4, 2007

(51) Int. Cl.
*B64G 1/64* (2006.01)
(52) U.S. Cl. ............................. 244/172.5; 244/172.4
(58) Field of Classification Search ............ 244/158.1, 244/172.4, 172.5, 135 A, 159.4
See application file for complete search history.

(56) References Cited

U.S. PATENT DOCUMENTS

| | | | | |
|---|---|---|---|---|
| 4,129,270 A | * | 12/1978 | Robinson et al. | ......... 244/135 A |
| 4,173,324 A | * | 11/1979 | Rudmann | ................. 244/172.5 |
| 5,299,764 A | * | 4/1994 | Scott | ....................... 244/172.5 |
| 5,305,970 A | * | 4/1994 | Porter et al. | ............. 244/172.2 |
| 5,511,748 A | | 4/1996 | Scott | |
| 5,803,407 A | | 9/1998 | Scott | |
| 5,806,802 A | | 9/1998 | Scott | |
| 6,017,000 A | | 1/2000 | Scott | |
| 6,330,987 B1 | | 12/2001 | Scott | |
| 6,364,252 B1 | * | 4/2002 | Anderman | ............... 244/158.6 |
| 6,479,800 B1 | | 11/2002 | Bueno Ruiz et al. | |
| 6,480,165 B2 | | 11/2002 | Moheb et al. | |
| 6,484,973 B1 | | 11/2002 | Scott | |
| 6,523,784 B2 | * | 2/2003 | Steinsiek et al. | ......... 244/172.4 |

(Continued)

FOREIGN PATENT DOCUMENTS

EP    0844473 A1    5/1998

(Continued)

*Primary Examiner*—Timothy D Collins
*Assistant Examiner*—Philip J Bonzell
(74) *Attorney, Agent, or Firm*—Ostrager Chong Flaherty & Broitman P.C.

(57) ABSTRACT

An in-space spacecraft servicing system (10) includes a servicing spacecraft (22) and a propellant module (24). The servicing spacecraft includes a client servicing system (136), as well as navigation avionics (108) for independent flight operation and a servicing propellant tank (170). The propellant module moves the servicing module from an upper stage drop off location and releases it in proximity to a client spacecraft (16) for a servicing mission. It has a propellant tank (172) with capacity for multiple missions and is used to refill the servicing spacecraft's propellant tanks between missions. Either or both the servicing spacecraft and the propellant module may have navigation avionics. The servicing spacecraft also has a universal docking adaptor (70) for different client spacecraft, and can convert a client spacecraft from non-cooperative to cooperative.

20 Claims, 11 Drawing Sheets

U.S. PATENT DOCUMENTS

| | | |
|---|---|---|
| 6,742,745 B2 | 6/2004 | Tchoryk et al. |
| 6,760,211 B2 | 7/2004 | Bueno Ruiz et al. |
| 6,840,481 B1 * | 1/2005 | Gurevich ............... 244/172.4 |
| 6,843,446 B2 | 1/2005 | Scott |
| 6,845,303 B1 | 1/2005 | Byler |
| 6,945,500 B2 | 9/2005 | Wingo |
| 6,969,030 B1 * | 11/2005 | Jones et al. ............. 244/172.5 |
| 2001/0028330 A1 | 10/2001 | Moheb et al. |
| 2003/0127568 A1 | 7/2003 | Tchoryk et al. |
| 2003/0128491 A1 | 7/2003 | Bueno Ruiz et al. |
| 2003/0192995 A1 | 10/2003 | Tchoryk et al. |
| 2004/0026571 A1 | 2/2004 | Scott |
| 2004/0094882 A1 | 5/2004 | Coppoolse |
| 2004/0212533 A1 | 10/2004 | Whitehead et al. |
| 2004/0245405 A1 | 12/2004 | Tchoryk et al. |
| 2005/0040282 A1 | 2/2005 | Wingo |
| 2006/0145024 A1 * | 7/2006 | Kosmas ................. 244/172.5 |

FOREIGN PATENT DOCUMENTS

| | | |
|---|---|---|
| EP | 1191271 A2 | 3/2002 |
| EP | 1193406 A2 | 4/2002 |
| EP | 11420179 A1 | 5/2004 |
| EP | 1529597 A1 | 5/2005 |
| WO | 2004054877 A | 7/2004 |
| WO | WO 2004054877 A1 * | 7/2004 |
| WO | 2005118394 A | 12/2005 |

\* cited by examiner

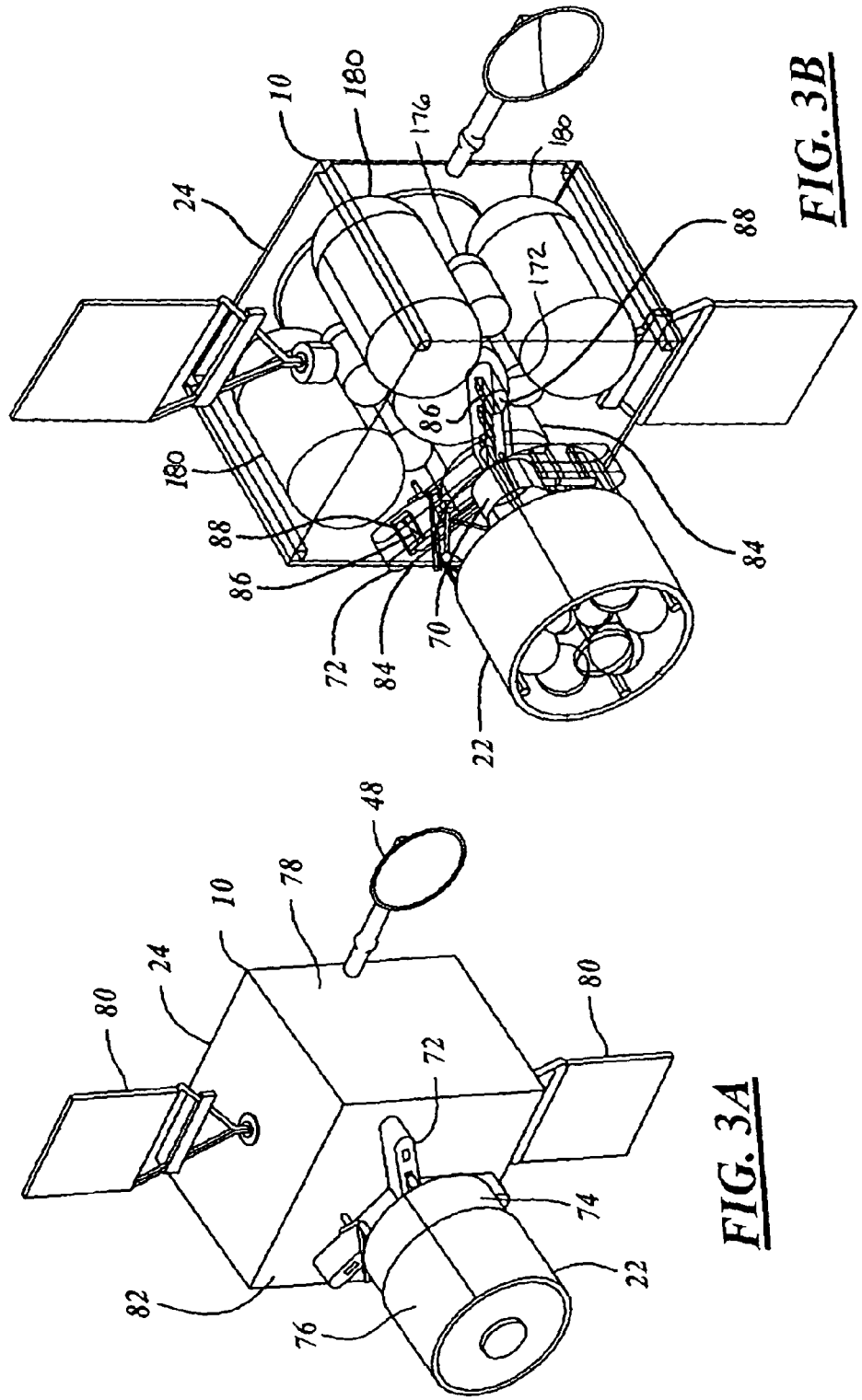

TWO PART SPACECRAFT SERVICING VEHICLE SYSTEM WITH ADAPTORS, TOOLS, AND ATTACHMENT MECHANISMS

TECHNICAL FIELD

The present invention relates generally to spacecraft and the in-space servicing thereof. More particularly, the present invention is related to the approaching, docking, coupling, and servicing of cooperative and non-cooperative spacecraft while in orbit.

BACKGROUND OF THE INVENTION

A significant portion of the spacecraft currently in orbit around the Earth are currently in need of servicing, or will be in the near future. The servicing needed may include propellant resupply, cleaning of solar panels, replacement or repair of various onboard equipment, or other servicing known in the art. These spacecraft are non-cooperative systems, which means that they are not designed to facilitate the servicing, docking or coupling with other space vehicles once on orbit.

There currently exists a technique of docking an extension spacecraft to a non-cooperative satellite for extending the life of that satellite. The extension spacecraft is designed specifically for that particular satellite, is permanently attached to that satellite, and has guidance, navigation, and controls for controlling all proximity operations with the satellite, as well as station keeping the resulting spacecraft-satellite combination. The extension spacecraft contains onboard propellant that is used by the extension spacecraft in performing all of the stated maneuvers. As such, the extension spacecraft concept is limited to one satellite and has limited use beyond this. The extension spacecraft is limited to controlling and adjusting the attitude and position of the spacecraft-satellite combination. Also, note that the satellite, the extension spacecraft, and the spacecraft-satellite combination remain in the satellites orbital position and are non-cooperative.

Another technique currently exists for launching into orbit a mothership vehicle that contains multiple operational service vehicles. Each of the operational service vehicles has a service module and a command module, which is attached and fixed to the service module. The service module has propellant, thrusters, and attitude control. The command module has target location/tracking/inspection sensors and robotic arms and grippers for performing service tasks. The operational service vehicles perform intricate tasks such as extending solar array panels or reorienting antennas. The stated vehicles are also limited in their use. The stated vehicles are limited in the amount of time they can operate away from the mothership, in their ability to replace spacecraft propellant and in their ability to provide a reliable or fixed connection with a spacecraft being repaired.

The above-stated extension spacecraft and service vehicles are also limited to single satellite service missions. Thus, for each spacecraft to be repaired a service vehicle must be launched into space. The associated costs, time, and efforts associated with each launch are substantial.

A significant portion of the satellites currently in orbit are spin-stabilized satellites. Docking with spinning satellites can be technically problematic. It is difficult to accurately position and adjust attitude angles and speed and angular velocity of servicing vehicles to align with the spin-stabilized satellites. A mismatch in alignment can cause a collision-like reaction. Thus, the spin-stabilized satellites are non-cooperative by their spinning nature alone. The remaining satellites are body stabilized satellites. Although easier to dock with, body stabilized satellites may also be non-cooperative.

Thus, there exists a need for a spacecraft that is capable of performing in-space service techniques, that overcomes the above-stated limitations, and that can be adjusted to safely and reliably dock with and service a variety of non-cooperative, cooperative, spin-stabilized, and body stabilized spacecraft.

SUMMARY OF THE INVENTION

One embodiment of the present invention provides an in-space servicing vehicle system that includes a servicing spacecraft and a propellant module. The servicing spacecraft includes a client servicing system for servicing a client spacecraft in space. The servicing spacecraft also includes navigation sensors and avionics for independent flight operation and propellant tanks for servicing. The propellant module moves the servicing spacecraft from an upper stage drop off location to a proximate location of the client spacecraft. The propellant module includes propellant tanks that contain propellant for multiple spacecraft-servicing missions. The servicing spacecraft separates from the propellant module and operatively approaches and docks with the client spacecraft.

Another embodiment of the present invention provides a similar in-space servicing vehicle system as stated in which the navigation control of the servicing spacecraft serves both the servicing spacecraft and the propellant module while the propulsive control of the propellant module serves both the propellant module and servicing spacecraft.

Another embodiment of the present invention provides a similar in-space servicing vehicle system as stated in which the navigation control and propulsive control of the servicing spacecraft serve both the servicing spacecraft and propellant module.

Still another embodiment of the present invention also provides a similar in-space servicing vehicle system as stated where the servicing spacecraft has a universal docking adaptor that couples to and converts the client spacecraft from non-cooperative to cooperative.

The embodiments of the present invention provide several advantages. One such advantage is the provision of an in-space servicing vehicle that is capable of performing multiple in-space missions and in doing so has the versatility and ability to accommodate and service multiple spacecraft using a minimal number of distinct mechanisms.

Furthermore, another advantage provided by an embodiment of the present invention is the provision of an in-space servicing vehicle that is capable of adjusting itself to the dynamic characteristics of servicing non-cooperative, cooperative, spin-stabilized, and body stabilized spacecraft.

Yet another advantage provided by an embodiment of the present invention is the provision of an in-space servicing vehicle that is capable of approaching, docking, and coupling to a client spacecraft without the manipulation or reconfiguration of the client spacecraft. Thus, the stated embodiment avoids the altering of the dynamic properties of the client spacecraft, minimizes disturbance to the client spacecraft, and minimizes the requirement for a realignment procedure at the completion of servicing the client spacecraft.

Still another advantage provided by an embodiment of the present invention, is the ability to achieve a soft, non-impact, sturdy, and reliable in-space connection to a variety of client spacecraft for servicing thereof.

The present invention itself, together with further objects and attendant advantages, will be best understood by reference to the following detailed description, taken in conjunction with the accompanying drawing.

BRIEF DESCRIPTION OF THE DRAWINGS

FIG. 3A is an external perspective view of the in-space servicing vehicle system of FIG. 1;

FIG. 3B is a perspective view of the in-space servicing vehicle system of FIG. 1 illustrating internal propellant tanks thereof;

DETAILED DESCRIPTION

Figure 1:
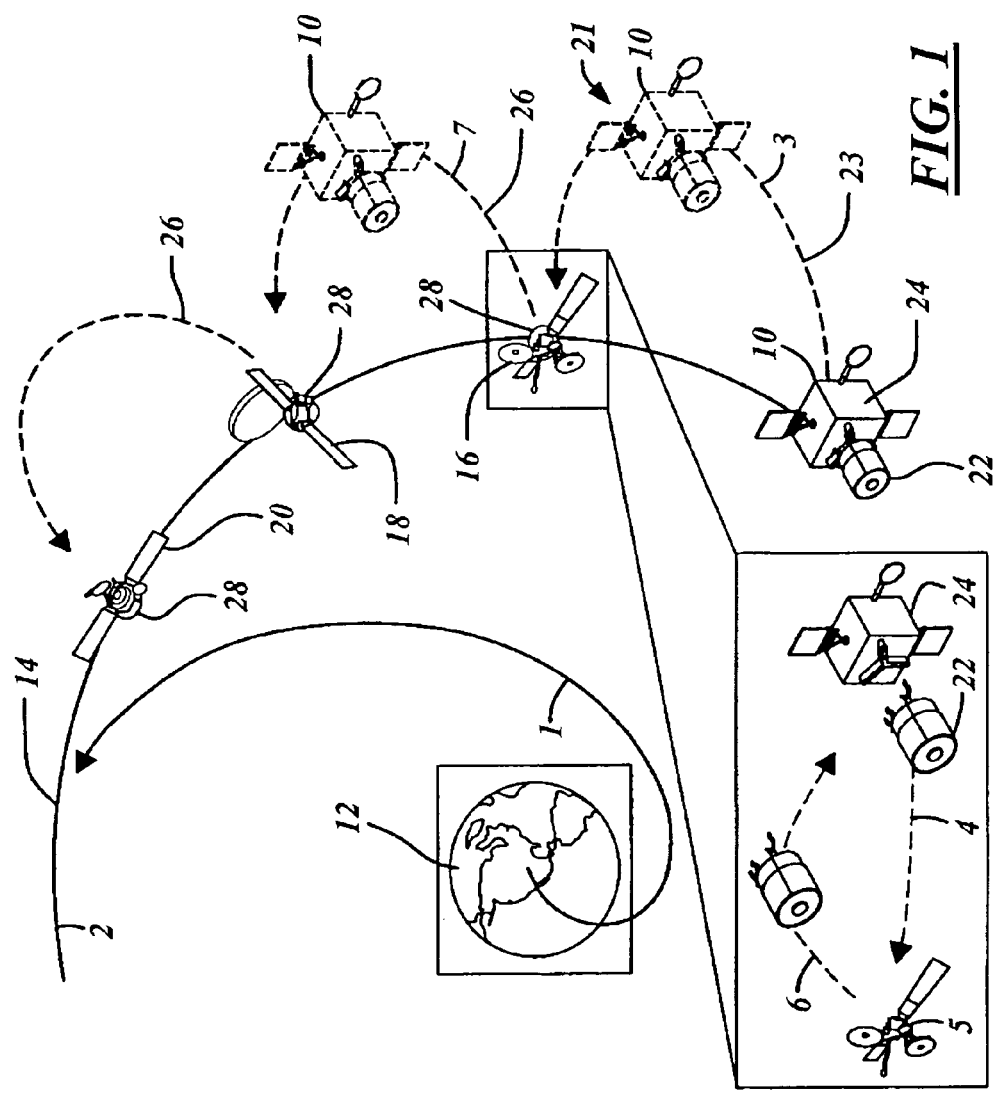
FIG. 1 is a multi-mission diagram incorporating an in-space servicing vehicle system in accordance with an embodiment of the present invention.

In each of the following Figures, the same reference numerals are used to refer to the same components. The present invention may be applied to various in-space servicing applications. The present invention may be used to service non-cooperative, cooperative, spin-stabilized, and body stabilized spacecraft, as well as other spacecraft known in the art. The present invention may also be used to perform various servicing tasks.

In the following description, various operating parameters and components are described for one constructed embodiment. These specific parameters and components are included as examples and are not meant to be limiting.

In the following description the terms "servicing" and "servicing tasks" may refer to any task performed by a spacecraft to clean, adjust, replace, repair, update, salvage, recommission, decommission, reposition, reorient, or align another spacecraft or components or systems thereof or to perform some other task on another spacecraft known in the art. Some example service tasks are the resupplying of spacecraft propellant, the cleaning, adjusting, replacement, and deployment assistance of solar arrays and panels, the updating and repairing of onboard electronics and software, the delivery of batteries, the delivery of attitude control devices, spacecraft inspection, and the orbital relocation of a spacecraft.

Also, in the following description the term "servicing mission" may refer to one or more servicing tasks performed on a particular spacecraft. The term "spacecraft-servicing mission" refers to a planned group of servicing tasks, which may be scheduled, and that are performed upon a particular spacecraft by a servicing vehicle prior to separation of the servicing vehicle from that spacecraft. As an example, a servicing vehicle may service multiple spacecraft and travel to each spacecraft between performing respective spacecraft-servicing missions.

Referring now to FIG. 1, a multi-mission diagram incorporating one or more in-space servicing vehicle systems 10 (only one is shown) in accordance with an embodiment of the present invention is shown. The in-space system 10 is capable of performing multiple spacecraft-servicing missions. The in-space system 10 is launched from earth 12 via a launch vehicle (not shown), such as a rocket, to a low earth orbit or to a geosynchronous orbit. The in-space system may be utilized for other types of missions as well, such as servicing spacecraft in sun synchronous or polar orbit. In this example, the in-space system 10 is shown in a geosynchronous orbit 14. The launch vehicle may consist of multiple stages and include one or more vehicles. For example, the launch vehicle may include an orbit transitory vehicle, which transfers the in-space system 10 from a low earth orbit to a geosynchronous orbit. The launch vehicle or the in-space system 10 itself may have the capabilities to transfer the in-space system 10 from a low earth orbit to a geosynchronous orbit. The launch of the in-space system 10 and the transition from a low earth orbit to a geosynchronous orbit is generally indicated by numerical designator 1.

In the diagram provided, three client spacecrafts 16 18, and 20, which are in the form of satellites, are shown. The in-space system 10 travels to each of the satellites for servicing thereof. Once in a geosynchronous orbit the in-space system 10 begins operations, as generally indicated by numerical designator 2. The in-space system 10 moves to a proximate location of a first client spacecraft, such as the proximate location 21 of the client satellite 16, for preparation and proximate servicing of that client spacecraft, as generally indicated by numerical designator 3. The in-space system 10 may travel along the elliptical orbit 14 of the client spacecrafts 16, 18, and 20, as shown, or in some other trajectory, one such trajectory 23 being shown.

The in-space system 10 includes a servicing spacecraft 22 and a propellant module 24. The servicing spacecraft 22 separates from the propellant module 24 and travels to, approaches, docks, and couples with the client spacecraft. This is generally indicated by numerical designator 4.

Once docked, the servicing spacecraft 22 performs servicing tasks associated with the spacecraft-servicing mission designated for the first client spacecraft, as generally indicated by numerical designator 5. Upon completion of the first spacecraft-servicing mission, the servicing spacecraft 22 separates from the first client spacecraft and returns to the propellant module 24, as represented by numerical designator 6. The servicing spacecraft 22 when coupled to the propellant module 24 may prepare for the next spacecraft-servicing mission. The servicing spacecraft 22 may refill its propellant tanks or perform some other tasks in preparation for the next servicing mission. After returning to the propellant module 24, the servicing spacecraft 22 docks and couples with the propellant module 24. The in-space system 10 then travels to the next client spacecraft to be serviced, such as the spacecraft 18. This is generally indicated by numerical designator 7. Trajectory paths 26 between spacecraft 16, 18, and 20 are shown.

The above-stated process, as represented by numerical designators 1-7, is for example purposes only. The process may be altered and steps therein may be performed simultaneously or in a different order depending upon the application. The circles 28 represent locations of the in-space system 10 during servicing of the spacecraft 16, 18, and 20.

Figure 2:
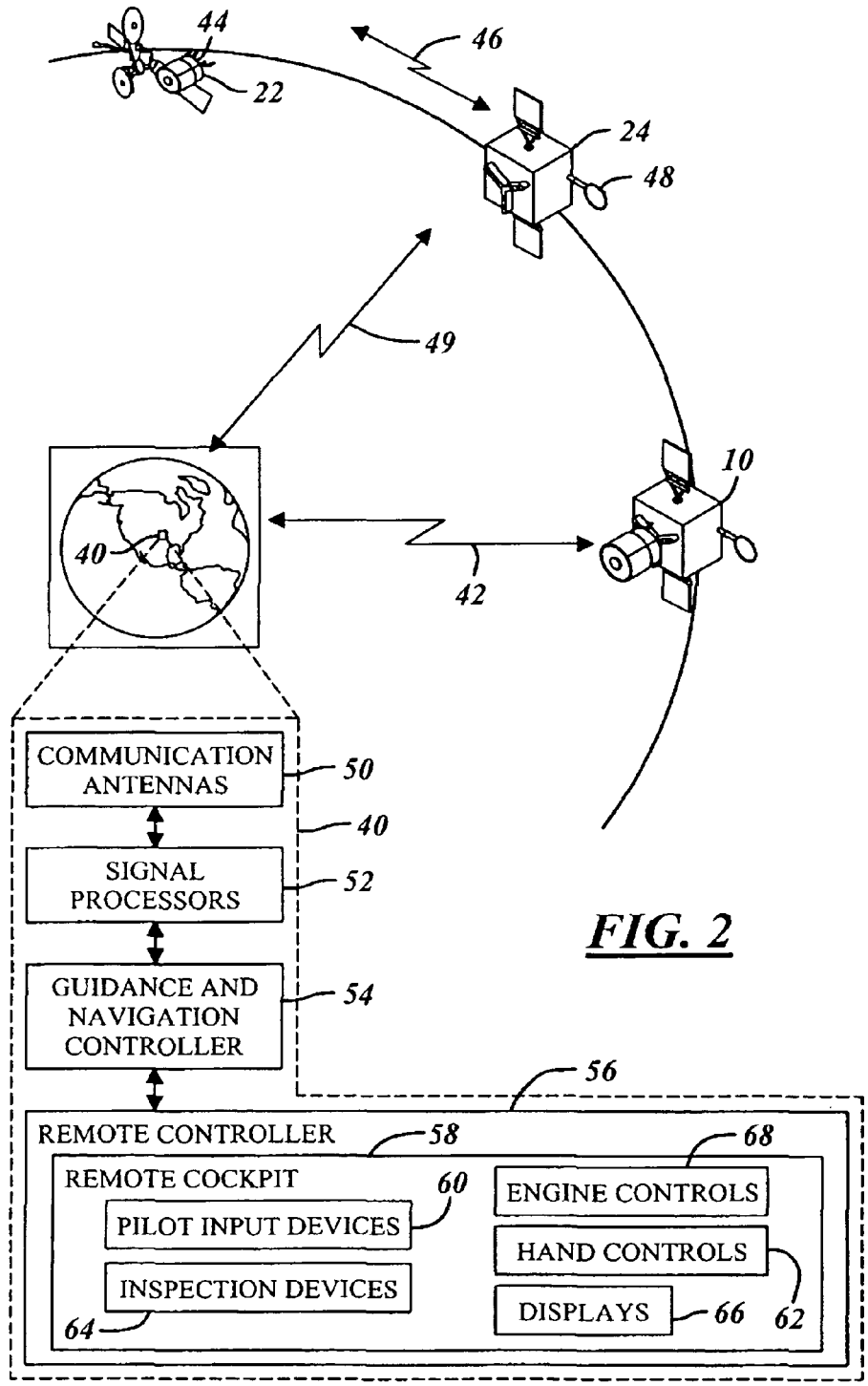
FIG. 2 is a single mission diagram illustrating communication between a servicing spacecraft, a propellant module, and a remote ground tracking and control system in accordance with an embodiment of the present invention.

Referring now to FIG. 2, a single mission diagram illustrating communication between the servicing spacecraft 22, the propellant module 24, and a remote ground tracking and control system 40 in accordance with an embodiment of the present invention is shown. The in-space system 10 may operate autonomously or may be remotely controlled via the ground station 40. The in-space system 10 is capable of communicating with the ground station 40, as represented by signal line 42. The servicing spacecraft 22 and/or the propellant module 24 may have communication electronics for communicating with the ground station 40. In the example embodiment shown, the servicing spacecraft 22 has an omni-directional antenna 44 and is capable of communicating with the propellant module 24, but not with the ground station 40. This is indicated by communication signal line 46. The propellant module 24 has a high gain antenna 48 for communicating with the ground station 40, as is indicated by communication signal line 49. In another embodiment the servicing spacecraft 22 communicates directly with the ground station 40, as indicated by communication signal line 42.

The ground station 40 includes communication antennas 50, signal processors 52, a guidance and navigation controller 54, and may include a remote controller 56. The guidance and navigation controller 54 contains systems for monitoring, tracking, and controlling the attitude, position, location, orbit and operation of one or more spacecraft including the in-space system 10. The remote controller 56 provides the systems and controls to remotely and manually adjust, alter, or control the attitude, position, location, orbit, and operation of one or more spacecraft including the in-space system 10. The remote controller 56 may include items, such as a remote cockpit 58, pilot input devices 60, hand controls 62, inspection devices 64, displays 66, engine controls 68, and other controls known in the art.

Figure 4:
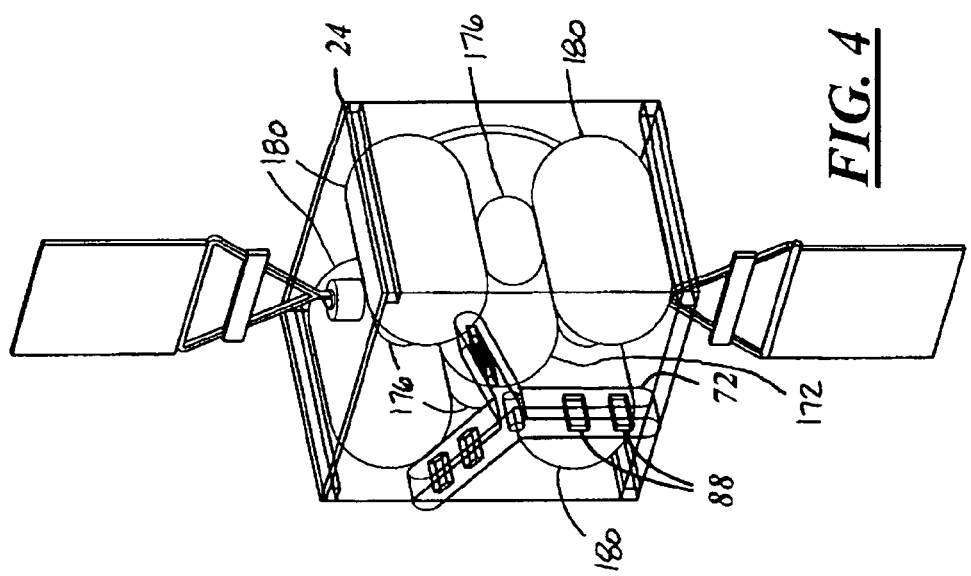
FIG. 4 is a perspective view of a propellant module in accordance with an embodiment of the present invention.

Referring now to FIGS. 3A, 3B and 4, perspective views of the in-space system 10 and a perspective view of the propellant module 24 are shown in accordance with an embodiment of the present invention. FIG. 3A provides an external perspective view, whereas FIG. 3B provides an internal perspective view. The servicing spacecraft 22 is coupled to the propellant module 24 via a universal docking adaptor 70 and a corresponding docking and coupling interface 72. The universal docking adaptor 70 is adjustable and reconfigurable to couple to various different spacecraft and to the docking interface 72. This is described in greater detail below.

The servicing spacecraft 22 includes a main body or servicing utility unit 74 and a solar array 76 which in this embodiment encircles at least a portion of the servicing unit 74. Alternate embodiments may include alternate solar array configurations or other means of power generation. The universal docking adaptor 70 is coupled to the servicing unit 74 and extends therefrom.

In a preferred embodiment, the propellant module 24 includes a main body or propellant utility box 78 from which solar arrays 80 and the main high gain antenna 48 are coupled and extend therefrom. Alternate embodiments may include alternate solar array configurations and antenna configurations. The docking interface 72 is attached to a front side 82 of the utility box 78.

The universal docking adaptor 70 has multiple adjustable and reconfigurable outward swinging arms 84 and coupling members 86. The coupling members 86 extend within channels 88 in the docking interface 72 and attach to the docking interface 72, as shown. Propellant is transferred from the propellant module 24 through the docking interface 72 and universal docking adaptor 70 to the servicing spacecraft 22. Propellant lines (not shown) may be connected between the servicing spacecraft 22 and the propellant module 24 via space rated quick disconnect devices known in the art.

In one embodiment, while docked with the propellant module 24, the servicing spacecraft 22 is in a power save mode and the propellant module provides the propulsion and navigation to transfer from client-to-client. In another embodiment, the servicing spacecraft 22 provides the navigation control for the in-space vehicle 10 while the propellant module 24 provides the propulsion. In still another embodiment, the servicing spacecraft 22 provides both the navigation control and propulsion for the in-space vehicle 10. With the servicing spacecraft 22 providing navigation control, the propellant module may be used solely as a set of propellant tanks, which the servicing module moves from client-to-client. The servicing spacecraft 22 may fill its own propellant tanks from propellant on the propellant module 24. When the servicing spacecraft 22 separates from the propellant module 24 to service a client spacecraft, the propellant module may be placed in some stable spinning orientation and left to drift in a predictable manner until the servicing spacecraft 22 returns.

Figure 5A:
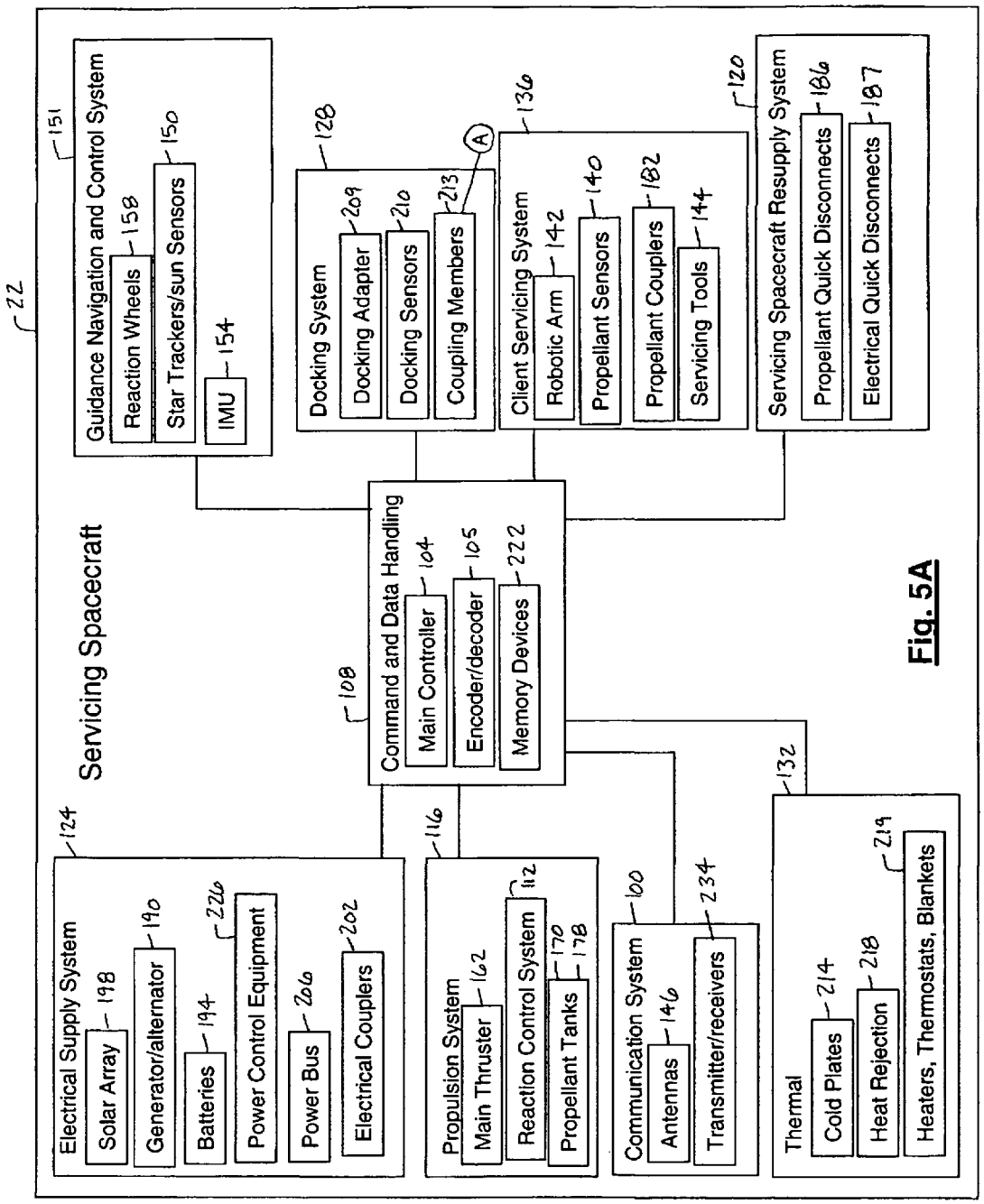
FIG. 5A is a block diagrammatic view of the in-space servicing vehicle system of FIG. 1.
Figure 5B:
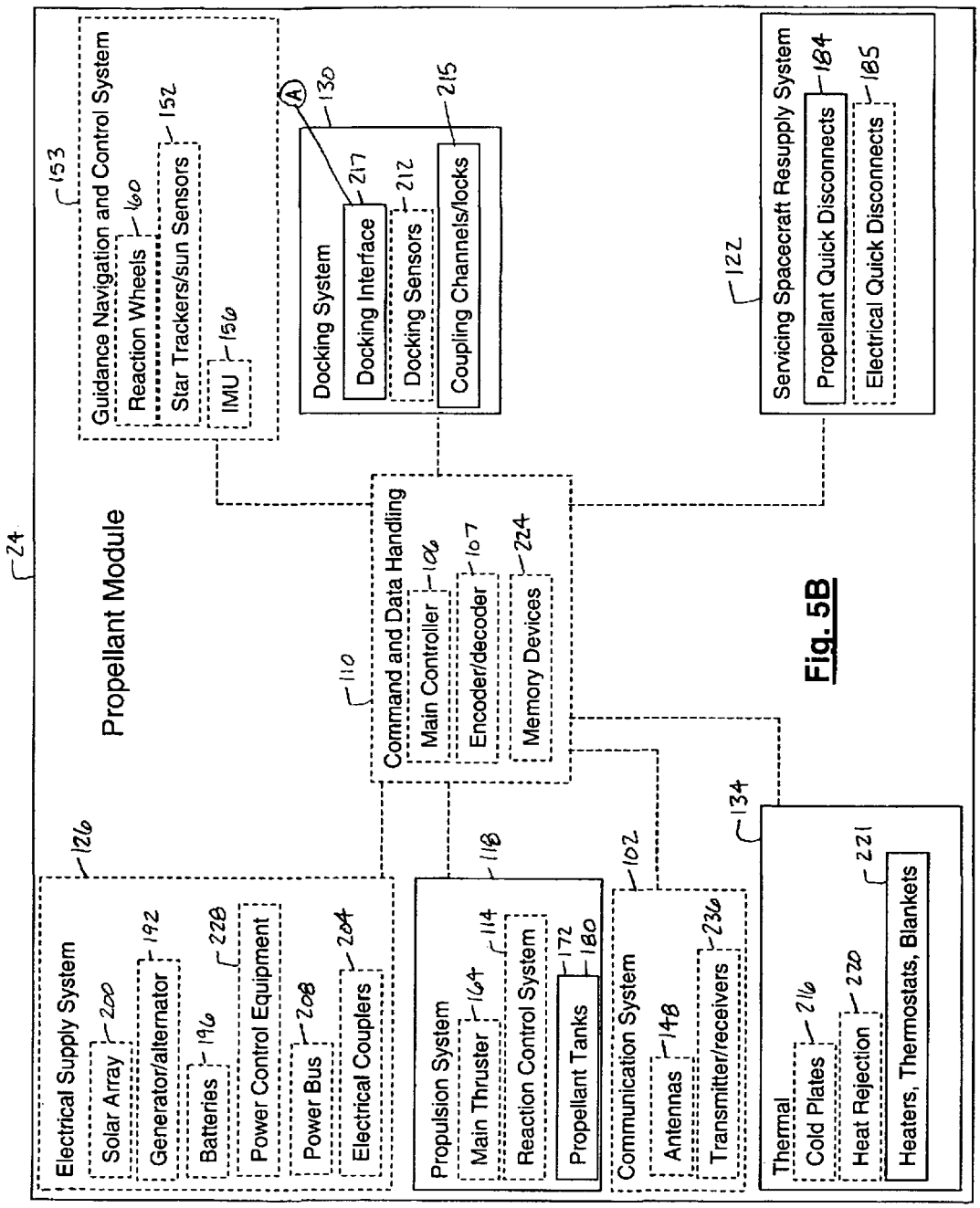
FIG. 5B is the block diagrammatic view of FIG. 5A continued.

Referring now also to FIGS. 5A-B, a block diagrammatic view of the in-space system 10 is shown. The servicing spacecraft 22 and the propellant module 24 may have a number of components including communication systems 100, 102, command and data handling systems 108, 110, guidance navigation and control systems 151, 153, propulsion systems 116, 118, servicing spacecraft resupply systems 120, 122, client servicing system 136 (servicing spacecraft only), electrical supply systems 124, 126, docking systems 128, 130, thermal control systems 132, 134, and other space related systems housed in their utility units/boxes 74, 78. The stated systems may include sensors, cameras, robotic systems, tools, and various other systems, components, and tools for performing various tasks associated therewith. The client servicing system 136 of the servicing spacecraft 22 may include a number of components, such as the propellant sensors 140, the robotic arm 142, propellant couplers 182, and the servicing tools 144.

Note that many of the systems and devices of the propellant module 24 are shown with dashed boxes to suggest that they may or may not be included. An example of this is when the propellant module 24 is being used solely as a set of propellant tanks. Although none of the systems and devices of the servicing spacecraft 22 are shown with dashed boxes, this does not suggest that all of the shown systems and devices of the servicing spacecraft 22 are required or used.

Each of the communication systems 100 and 102 may include main controllers 104 and 106, encoder/decoders 105, 107, memory devices 222, 224, as well as communication antennas, transmitters/receivers, and other communication equipment known in the art. The communication systems 100 and 102 may be in communication with each other, with a ground-based system, and/or with other spacecraft.

The main controllers 104 and 106 may be microprocessor based such as a computer having a central processing unit, memory (RAM and/or ROM), and associated input and output buses. The main controllers 104 and 106 may be application-specific integrated circuits or may be formed of other logic devices known in the art. The main controllers 104 and 106 may be portions of a central vehicle main control unit, may be control circuits having power supplies, may be combined into a single integrated controller, or may be stand-alone controllers as shown.

In a preferred embodiment, each spacecraft subsystem on the servicing spacecraft 22 and propellant module 24 is a separate entity. They communicate with each other, but operate independently. Alternate embodiments of the servicing spacecraft 22 and/or propellant module 24 could combine any subsystem with a combination of one or some or all of the other spacecraft subsystems. For example, the command and data handling systems 108 and 110 and the propulsion systems 116 and 118 may include the communication systems 100 and 102 and any other command or flight operation systems and devices known in the art. The command and data handling systems 108 and 110 and the propulsion systems 116 and 118 may include equipment typically found on a spacecraft with regards to flight operations, navigation, guidance, communication, etc.

The guidance navigation and control systems 151 and 153 may include star trackers/sun sensors 150, 152, IMUs 154, 156, and reaction wheels 158, 160.

The propulsion systems 116 and 118 may include main thrusters 162, 164, reaction control systems 112, 114, onboard mono propellant tanks 170, 172, helium or other pressurant tanks 174, 176 (shown in FIGS. 4 and 6) and/or fuel and oxidizer tanks 178, 180, and other propellant related tanks known in the art. The pressurant tanks 174, 176 may be used to pressurize the propellant tanks 170, 172 178, 180. The propulsion systems 116 and 118 provide propellant for flight by the servicing spacecraft 22 and/or the propellant module 24. The propulsion systems 116 and 118 supply propellant to the thrusters 162 and 164, which are controlled by the command and data handling systems 108 and 110 and the main controllers 104 and 106. The propellant tanks 170, 172, 178, 180 are pressurized and thus propellant contained therein is transferred through the use of valves (not shown).

In a preferred embodiment, the propellant tanks 172 and 180, on the propellant module 24, act as storage tanks and contain enough propellant for both units to perform multiple spacecraft-servicing missions. The propellant tanks 172 and 180 contain enough propellant to allow the servicing spacecraft 22 to perform multiple spacecraft-servicing missions, for the propellant module 24 to travel between multiple spacecraft, and/or for propellant resupply of multiple client spacecraft. In another embodiment, there could be separate sets of propellant tanks on the propellant module 24, one set for storing client propellant and one set for storing propellant for the propellant module 24 and/or the servicing spacecraft 22 to use to travel between multiple client spacecraft. The propellant tanks 170 and 178 on the servicing spacecraft 22 contain enough propellant to perform one or more spacecraft-servicing missions.

The servicing spacecraft resupply systems 120 and 122 and the client servicing system 136 may include the main controllers 104 and 106 that control the transfer of propellant from the propellant module 24 to the servicing spacecraft 22 and/or from the servicing spacecraft 22 to a client spacecraft being serviced. Propellant couplers in the form of quick disconnects 184 and 186 within or on the servicing spacecraft 22 and the propellant module 24 are used to couple the propellant supply and return lines (not shown). Propellant may be transferred from propellant tanks through propellant lines on the propellant module 24 to the servicing spacecraft 22, either through docking ports in the universal docking adaptor 70 and the docking interface 72 between the propellant module 24 and servicing spacecraft 22, and/or through a robotic arm for coupling propellant lines to propellant tanks on the servicing spacecraft 22. Propellant may also be transferred from the propellant tanks and propellant lines on the servicing spacecraft 22 to propellant tanks located on a client spacecraft being serviced. Example of client spacecraft propellant lines and couplings and techniques for attaching thereto are shown in and described with respect to FIGS. 9 and 12-13.

The electrical supply systems 124 and 126 may include generator/alternators 190, 192, batteries 194, 196, solar arrays 198, 200, power busses 206, 208, power control equipment 226, 228, and various electrical connections, lines, and couplers between the utility unit/boxes 74 and 78 and any spacecraft docked therewith, which are designated as spacecraft electrical couplers 202, 204. Upon docking of the servicing spacecraft 22 to the propellant module 24, electrical connections may be made between the electrical supply system 124 and the electrical supply system 126 using the electrical quick disconnects 187 and 185. Electrical power may be supplied between power buses 206, 208 and/or the batteries 194 and 196. The electrical supply systems may include or be connected to the main controllers 104 and 106 which monitor and adjust the supply of electrical power.

The docking systems 128 and 130 may include docking sensors 210 and 212. The docking sensors 210 and 212 may be used to assure that the servicing spacecraft 22, the propellant module 24, and various client spacecraft are docked and coupled to each other properly, especially prior to any propellant transfer. The docking sensors 210 and 212 may be of various types and styles. The docking sensors 210 and 212 may be in the form of contact sensors, infrared sensors, resistive sensors, cameras, or other similar sensors known in the art.

The servicing spacecraft docking system 128 may contain one or more docking adapters 209 and coupling members 213 used to dock the servicing spacecraft 22 to the propellant module 24 or to various client spacecraft. The docking adaptor 209 may include the universal docking adaptors 70 and 300, which are described above and also further below. The coupling members 213 may include the coupling members 86, 320, and 370 described above and below. The propellant module docking system 130 may include coupling channels/ locks 215, such as the channels 88 described above. The docking system 130 also may include a docking interface 217, similar to the above-described docking interface 72 which couples to the universal docking adaptor 70.

The thermal control systems 132 and 134 provide the utility unit/boxes 74 and 78 with the systems to control the temperatures of the subsystem hardware and propellant system elements located within the utility unit/boxes 74 and 78. The thermal control systems 132 and 134 as embodied may include coldplates 214, 216, and heaters, thermostats and blankets 219, 221, which may be coupled to the communication systems 100 and 102, the command and data handling systems 108 and 110, and the electrical power supply systems 124 and 126. The cold plates 214 and 216 are coupled to heat rejection systems 218 and 220 as typically found and utilized in the art.

The client servicing system 136 may include the main controller 104 and any other devices, systems, and tools in the above-stated systems and others known in the art. The client servicing system 136 is used in general to perform servicing tasks on client spacecraft, but may be used to perform servicing tasks on the servicing spacecraft 22 or the propellant module 24. The servicing spacecraft resupply system 122 in general is not used to perform servicing tasks other than to resupply propellant to the servicing spacecraft 22, but may be used to perform servicing tasks on the servicing spacecraft 22 or the propellant module 24.

The utility unit/boxes 74 and 78 and the above-identified systems contained therein may include additional housings (not shown) for other standard bus box sub systems that are normally found on a spacecraft. The utility unit/boxes 74 and 78 may include memory or data storage devices 222, 224, power control boxes and equipment 226, 228, encoders/decoders 105, 107 and other flight equipment, some of which may be part of one or more of the above-stated systems, as shown. The utility unit/boxes 74 and 78 include standard satellite bus functions, such as communication, power generation and distribution, and command and data handling.

Figure 6:
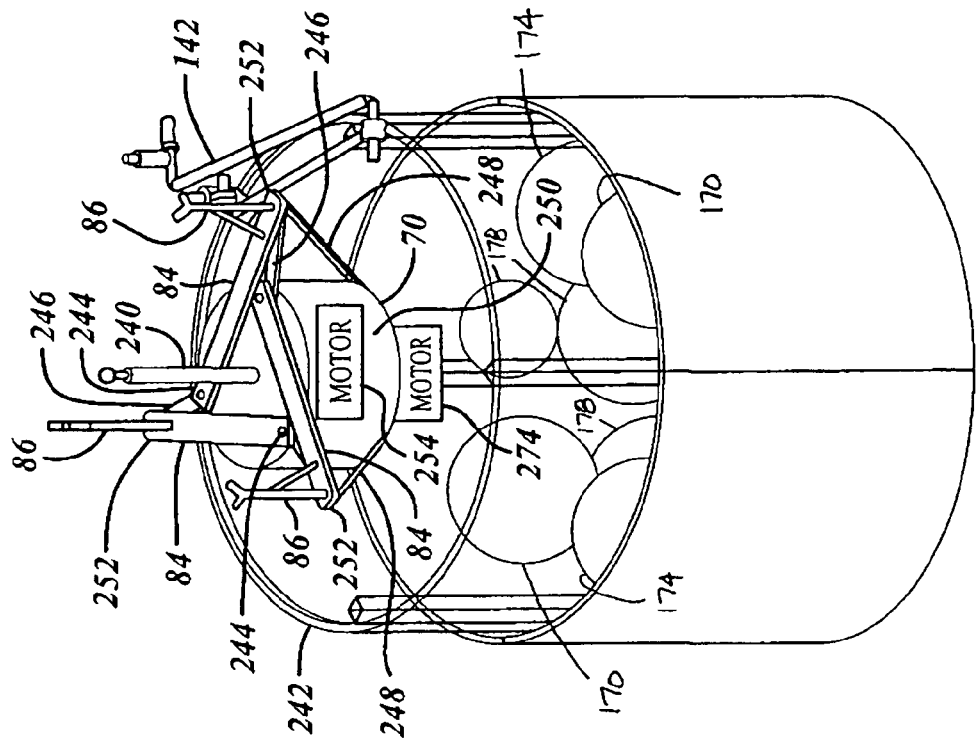
FIG. 6 is a perspective view of a servicing spacecraft in accordance with an embodiment of the present invention.
Figure 7A:
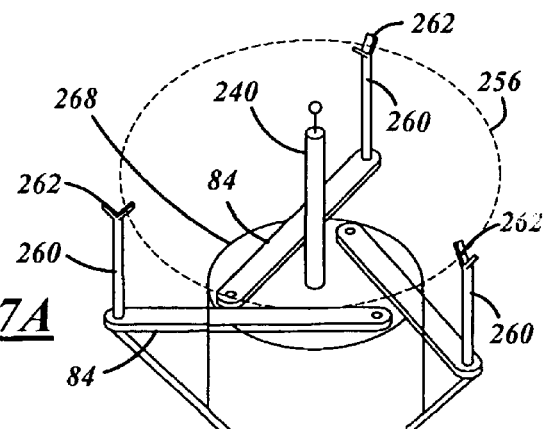
FIG. 7A is a perspective view of an adjustable spacecraft coupling adaptor in a non-deployed orientation and in accordance with an embodiment of the present invention.
Figure 7B:
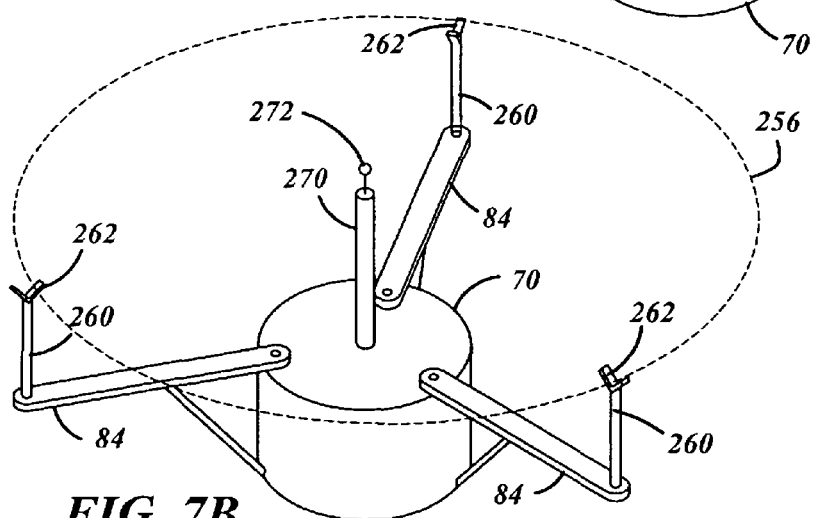
FIG. 7B is a perspective view of an adjustable spacecraft coupling adaptor in a fully deployed orientation and in accordance with an embodiment of the present invention.

Referring now to FIGS. 6, 7A and 7B, a perspective view of the servicing spacecraft 22 incorporating the universal docking adaptor 70 and a perspective close-up view of the universal docking adaptor 70 are shown in accordance with an embodiment of the present invention. FIG. 7A shows the universal docking adaptor 70 non-deployed and FIG. 7B shows the universal docking adaptor 70 fully deployed. The servicing vehicle 22, as shown, includes the universal docking adaptor 70, the robotic arm 142, and the thruster probe 240. Note that the servicing spacecraft 22 is typically smaller in size than the client spacecraft it services, and can be configured and shaped to approach various client spacecraft while minimizing interference and without causing damage to the client spacecraft.

In FIG. 6, the universal docking adaptor 70 is coupled to a front end 242 of the servicing spacecraft 22 and includes the outward swinging arms 84 and the coupling members 86. The arms 84 swivel via pins 244 and linkages 246, which couple adjacent arms 84. The arms 84 are supported by support elements 248, which are coupled to a base 250. The coupling members 86 extend axially from the arm ends 252 of each arm 84 and are used to couple to the docking interface 72 and to other spacecraft. An adaptor motor 254 is coupled within the base 250, may be activated by the main controller 104, and is used to adjust the orientations of the arms 84. Additional motors and linkages may be used to allow the coupling members 86 to be rotated, retracted, or placed in different orientations. The configuration provided allows the arms 84 to be evenly swiveled outward in a uniform manner and at a multiple number of increments. This allows the universal docking adaptor 70 to couple to many client spacecraft having different configurations. For example, the universal docking adaptor 70 may be adjusted to align with, contact, and couple to different sized launch adaptor rings of different client spacecraft.

As shown in FIGS. 7A and 7B, the coupling members 86 are shown swiveled radially outwardly to different circumferential positions for coupling to different diameter adaptor rings of client spacecraft, as represented by dashed circles 256. The configuration of the arms 84 and the coupling members 86 is shown for example purposes only; various other configurations may be utilized.

Figure 11:
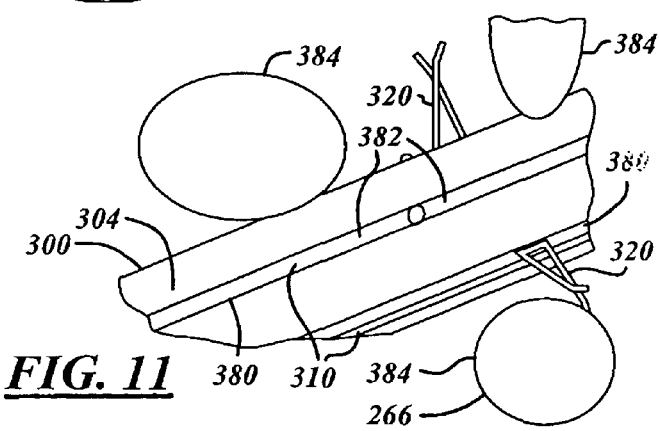
FIG. 11 is a close-up perspective view of a portion of the universal docking adaptor of FIG. 9.

The coupling members 86 may be of various types, styles, and may be in various configurations. In the example embodiment shown, each of the coupling members 86 has a main member 260 and an engagement member 262 attached thereto. For example, the engagement member can have a "Y"-shape for engaging an adaptor ring of a client spacecraft. The coupling members 86 may have pads, dampening materials attached, or other items to provide a soft contact of the servicing spacecraft 22 and client spacecraft. Sample pads 264 are shown with respect to the embodiment of FIG. 10. The coupling members 86 may also have inflatable airbags 266 (only one is shown) or the like that extend therefrom, as shown in FIG. 11, which dampen the interaction between the servicing spacecraft 22 and a client spacecraft.

Figure 8:
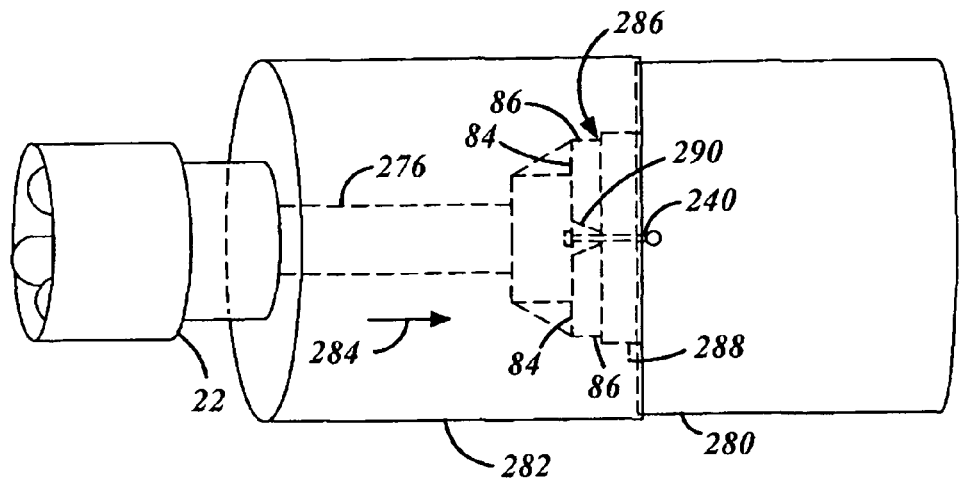
FIG. 8 is a side perspective view of a servicing spacecraft with a telescoping and rotating boom in relation to a client spacecraft and in accordance with an embodiment of the present invention.
Figure 10:
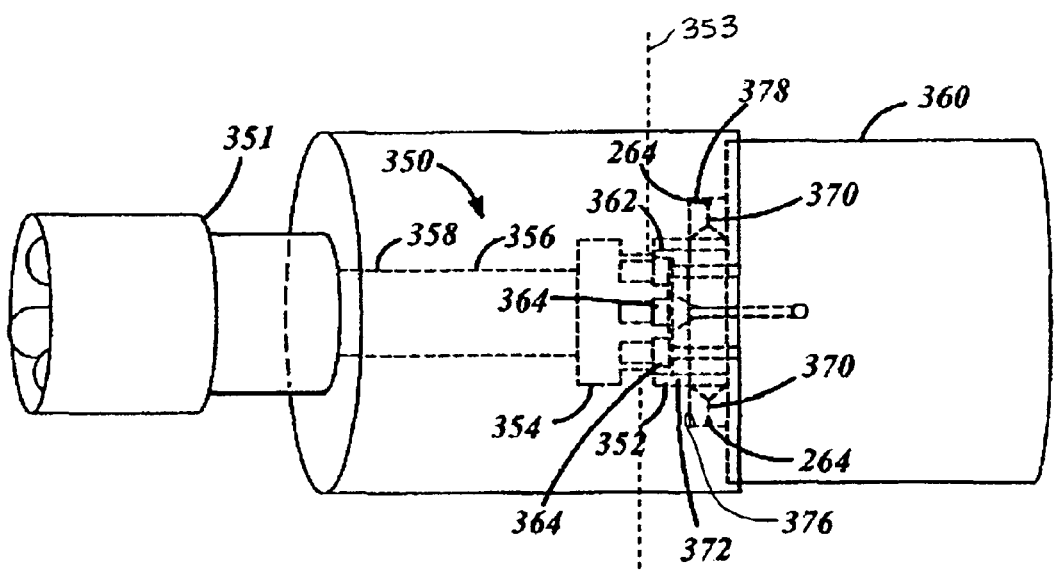
FIG. 10 is a side perspective view of a dual servicing coupling adaptor system in accordance with another embodiment of the present invention.

The thruster probe 240 is aligned with the center axis and used in the approach and alignment of the servicing vehicle 22 with a client spacecraft. The thruster probe 240 extends from the center 268 of the base 250 and is aligned with a thruster of a client spacecraft. Multiple thruster probe designs known in the art can be utilized for attachment to the thruster cone of the client satellite. For example, the tip 270 of the thruster probe 240 can have an expandable element 272, which expands in the client spacecraft thruster. In a preferred embodiment, during the approach process and with respect to a spin-stabilized spacecraft, the entire servicing vehicle 22 is spun through propulsion or other means to rotate at the same rate and about the same axis as the client spacecraft. The base 250 is projected towards the spinning spacecraft to allow for insertion of the probe 240 into the respective thruster. The base 250 is projected, via the adaptor motor 254, the telescoping boom motor 274, and the telescoping boom 276, which is shown in FIGS. 8 and 10. The telescoping boom 276 is adaptable to a specific depth of a client spacecraft being serviced. In an alternate embodiment, only the base 250 is rotated, at the same rate and about the same axis as the client, and projected, via the adaptor motor 254, the telescoping boom motor 274, and the telescoping boom 276. In this case the main body 74 of the servicing spacecraft 22 does not rotate with respect to the rotating client.

Figure 12:
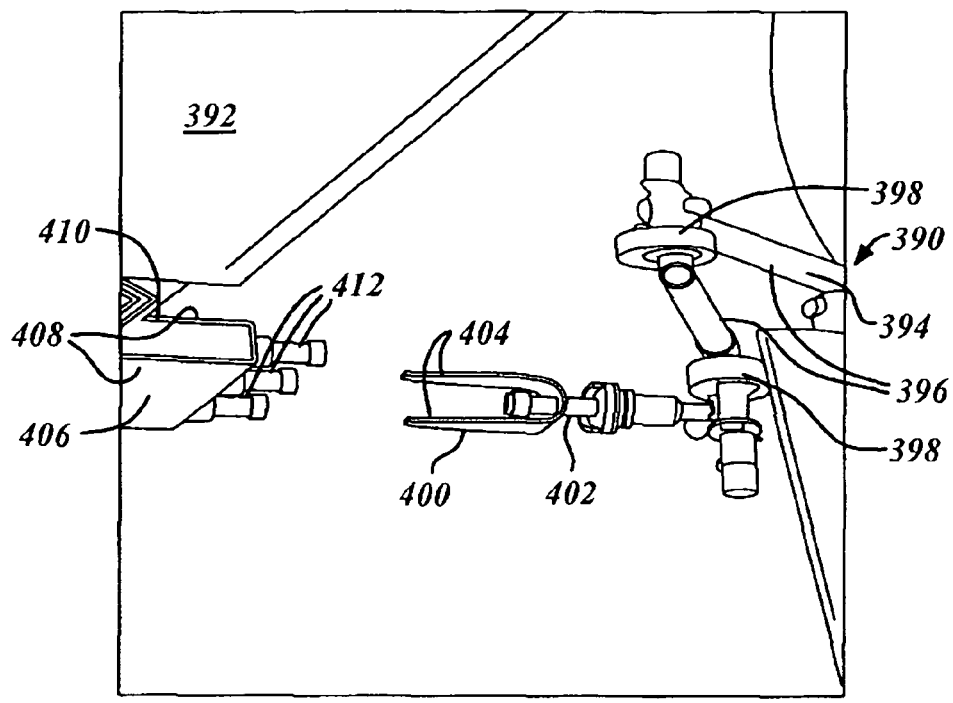
FIG. 12 is a close-up perspective view of a propellant transfer coupling and transfer servicing system in accordance with an embodiment of the present invention.

As shown in FIG. 12, a robotic arm 142 may be used on the servicing spacecraft 22 to perform various servicing tasks. Tools may be coupled to the end of the robotic arm 142 to accommodate for such tasks. Although a single robotic arm is shown, any number of which may be incorporated. Some tools are shown in FIGS. 5, 12, 13, and 15.

Referring now to FIG. 8, a side perspective view of a servicing spacecraft 22 in relation to a client spacecraft 280 in accordance with an embodiment of the present invention is shown. In the embodiment shown, the servicing spacecraft 22 is configured with the telescoping and rotating boom 276, which extends within a cylindrical solar array 282 of a client spacecraft 280. The extension direction is depicted by arrow 284. The telescoping boom 276 may have telescoping sections (not shown), may turn outward via a screw (not shown), or may telescope outward using some other technique known in the art.

As the boom 276 is extended the arms 84 of the docking adaptor are swiveled outward and the coupling members 86 are extended in a forward direction to align with the rim 286 of the launch adaptor ring 288. The thruster probe 240 is inserted into the thruster 290 and the tip 272 is expanded to hold the probe 240 in position relative to the client spacecraft

280. After insertion of the probe 240, the coupling members 86 are projected forward to mate with the launch ring 288.

Figure 9:
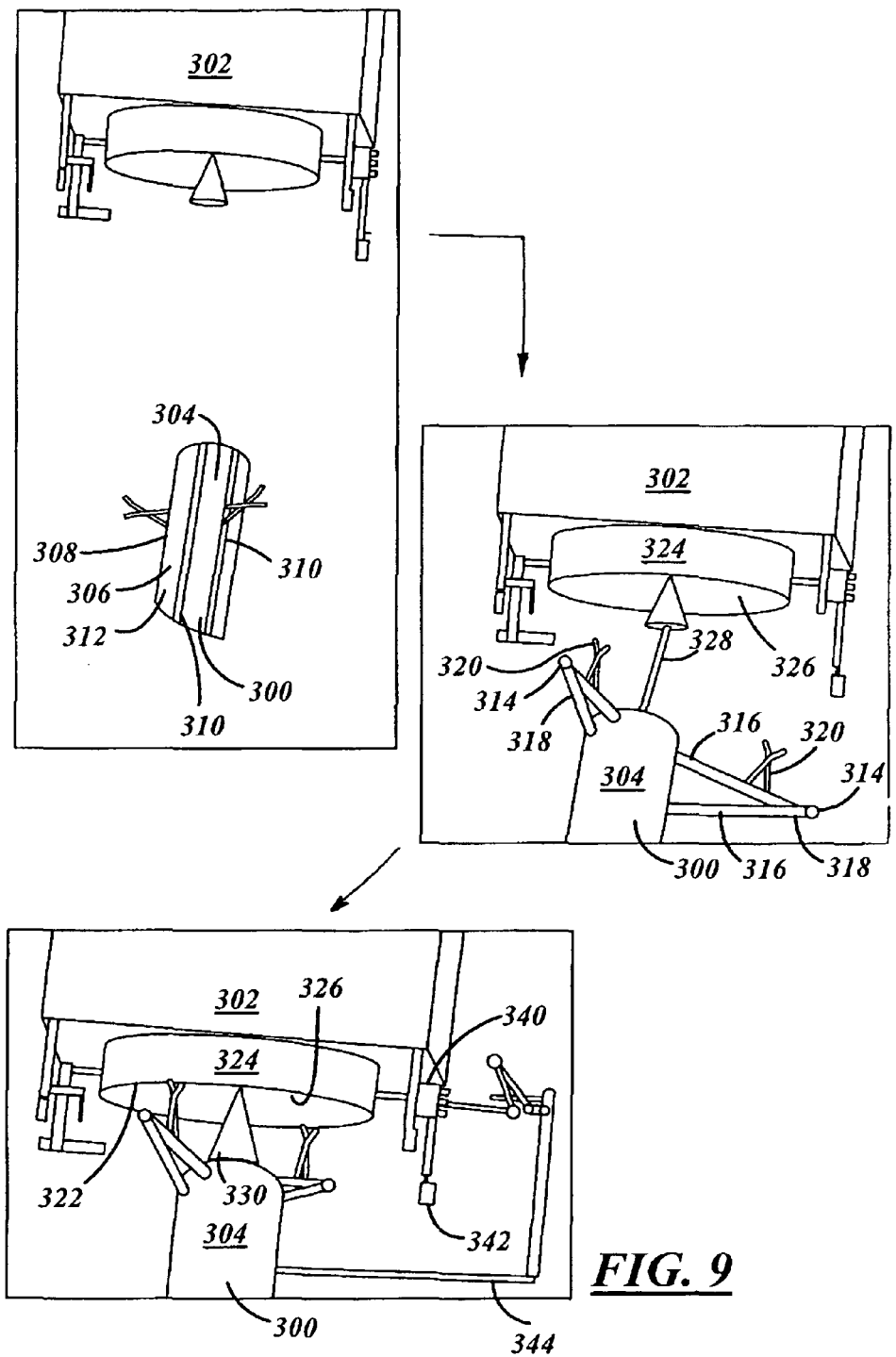
FIG. 9 is a perspective approaching and coupling diagram of universal docking adaptor coupling to a client spacecraft in accordance with another embodiment of the present invention.

Referring now to FIG. 9, a perspective diagram of a universal docking adaptor 300 of a servicing spacecraft is shown coupling to a client spacecraft 302 in accordance with another embodiment of the present invention. In the diagram, a main support cylinder portion 304 of a telescoping boom 306 of a servicing spacecraft, similar to the servicing spacecraft 22 above-described, is shown. The telescoping boom 306 does not have a base on the forward end 308, as with the telescoping boom 276 in FIG. 8. The main support cylinder 304 has reinforcement structure in the form of ribs 310 that extend longitudinally at predetermined and regular increments along the cylindrical side 312 of the main support cylinder 304. The ribs 310 have hinges or joints 314, which allow segments 316 thereof to fold and form arms 318. Coupling members 320, similar to the coupling members 86, may be attached to one or more of the segments 316. The coupling members 320 are used to couple to the rim 322 of the launch adaptor ring 324 of the client spacecraft 302. The coupling members 320 when coupled across multiple segments 316 are able to be extended laterally outward to couple and press against the interior surface 326 of the launch adaptor ring 324.

In the diagram provided the servicing spacecraft approaches the client spacecraft 302. The telescoping boom 306 and thus the main support cylinder 304 is extended toward the thruster of the client spacecraft 302. A thruster probe 328, similar to the thruster probe 240 in FIG. 8, is extended from the main support cylinder 304 and into the thruster 330 of the client spacecraft. The arms 318 are extended outward, via the joints 314 and internal motors (not shown). The coupling members 320 are then aligned and brought into contact with the rim 322.

The client spacecraft 302 shown has a propellant transfer coupling assembly 340 with a stabilizer thruster 342 attached thereto. A robotic arm 344 may extend from the servicing spacecraft and couple to the propellant transfer coupling assembly 340. This is further shown and described with respect to the embodiments of FIGS. 12-15.

Referring now to FIG. 10, a side perspective view of a dual-function servicing coupling adaptor system 350 of a servicing spacecraft 351 in accordance with another embodiment of the present invention is shown. The dual-function adaptor system 350 includes a first adaptor 352 and a second adaptor 354. The dashed line 353 shows the breaking point between the first adaptor 352 and the second adaptor 354. The first adaptor 352 includes cooperative coupling mechanisms 362 which interface with the cooperative coupling mechanisms 364 on the second adaptor 354. The first adaptor also includes non-cooperative interface mechanisms for attaching to the client satellite. These mechanisms include coupling members 370 and pads 264. The second adaptor 354 is coupled to the end 356 of a telescoping boom 358. For coupling the two spacecraft together, the first adaptor 352 is coupled to the second adaptor 354. The first adaptor 352 is delivered to the client spacecraft 360 by the servicing spacecraft 351 and is permanently attached to and converts the client spacecraft 360 from a non-cooperative spacecraft (lacking a usable adaptor) to a cooperative spacecraft (having a usable adaptor). The second adaptor 354 remains on the telescoping boom 358 and separates from the first adaptor 352 upon servicing the client spacecraft 360.

In one embodiment the first adaptor 352 has a cooperative coupling mechanism 362 which is fixed in the frame of reference of the client spacecraft 360. In an alternate embodiment, the first adaptor 352 has a non-spinning inner section and cooperative coupling mechanisms 362. As the client spacecraft 360 is spinning, the inner section and cooperative coupling mechanism 362 may in effect be rotated in an opposite direction to compensate for the rotation of the client spacecraft 360. Furthermore, the rotation of the inner section and cooperative coupling mechanism 362 can be fine-tuned by commands from either the client spacecraft or the servicing spacecraft. This equal and opposite rotation of the inner section and cooperative coupling mechanism 362 in effect causes the inner section and cooperative coupling mechanism 362 to be stationary. As an alternative, bearings (not shown) or the like may be coupled between the inner section and cooperative coupling mechanism 362 and the client spacecraft 360 and/or the inner section and cooperative coupling mechanism 362 may be weighted or balanced such that it remains stationary. The non-rotation of the inner section and cooperative coupling mechanism 362 allow the first adaptor 352 to be easily approached and docked to in the future. The cooperative coupling mechanisms 362 and 364 may include docking couplers, propellant transfer couplers, and electrical couplers, as well as other couplers known in the art.

The first adaptor 352, as shown, illustrates another example of coupling members that may be used with a universal docking adaptor of the servicing spacecraft, such as that described above. In this embodiment, the non-cooperative interface of the first adaptor 352 includes the coupling members 370. The coupling members 370 extend laterally outward from the base 372. The coupling members 370 have the pads 264, which are pressed against the inner wall 376 of the launch adaptor ring 378.

Referring now to FIG. 11, a close-up perspective view of a portion of the universal docking adaptor 300 and main support structure 304 of FIG. 9 is shown. The main support structure 304 has the reinforcement ribs 310, which slide in slots 380. The ribs 310 are able to extend laterally outward and fold via the joints 314. The coupling members 320 are shown as being attached to the segments 382 of the ribs 310. Airbags 384 may be deployed from or attached to the main support structure 304, the ribs 310, and/or the coupling members 320.

The airbags 384 may deploy perpendicular to the main support structure 304. The airbags 384 may be inflated gradually, until they touch the interior surface of a client spacecraft element, such as the launch adaptor rings 324 and 378. The airbags 384 serve as dampening cushions to reduce the mismatch impact between the speed/attitude of the main support structure 304 and the speed/attitude of the client spacecraft to be serviced.

Figure 13:
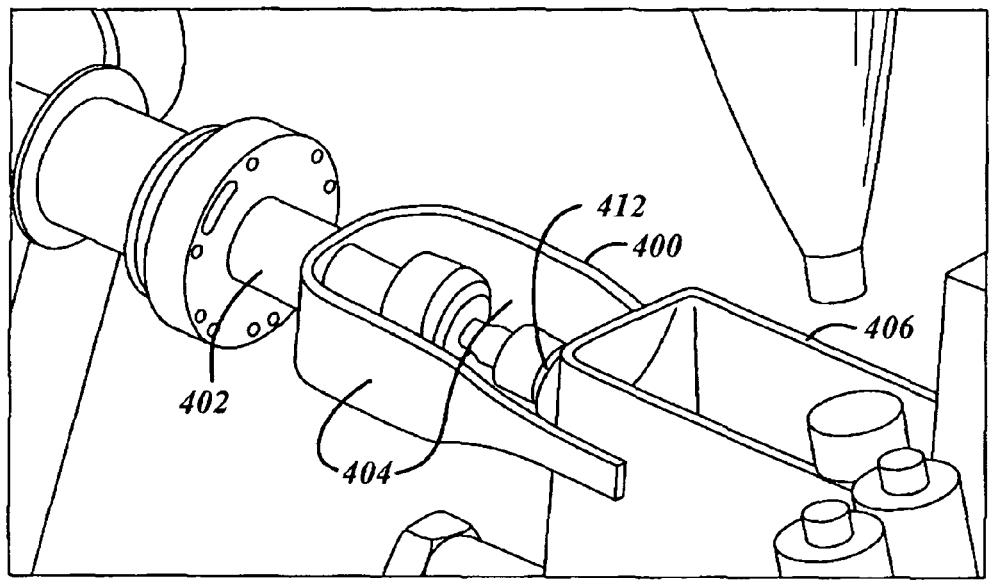
FIG. 13 is a close-up view of a propellant transfer system self-aligning tool in accordance with an embodiment of the present invention.

Referring now to FIGS. 12 and 13, close-up perspective views show a propellant transfer coupling and transfer servicing system 390 to be detached and attached to a client spacecraft 392 in accordance with an embodiment of the present invention. The propellant transfer system 390 shown includes a robotic arm 394 having multiple sections 396 that pivot relative to each other via motors 398 coupled therebetween. The robotic arm 394 has a tool 400 equipped with a self-aligning adaptor 404, which is coupled to a propellant transfer coupling end 402 of the robotic arm 394. The self-aligning adaptor 404 is "U"-shaped and has an open width between fork members 404 that is approximately equal to the width of a client spacecraft propellant transfer coupling assembly 406 of the client spacecraft 392. The fork members 404 slide over the outer surfaces 408 of an outer bracket 410 of the client propellant transfer coupling assembly 406. This guides the propellant transfer coupling end 402 to align and mate with one of the corresponding client propellant transfer couplings 412 extending from the bracket 410. Of course, various other propellant transfer coupling configurations and arrangements may be utilized.

Figure 14:
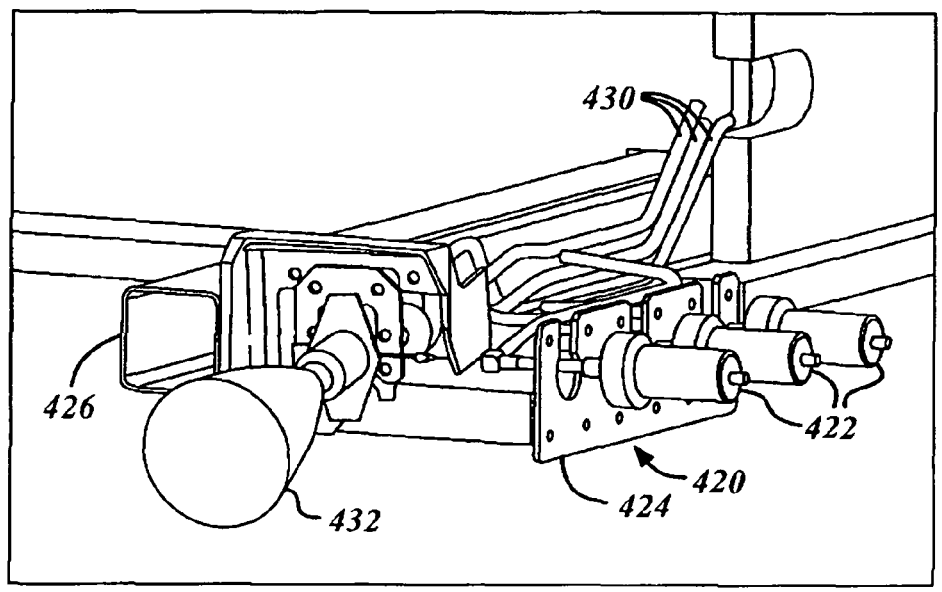
FIG. 14 is a close-up perspective view of a client spacecraft propellant transfer coupling assembly.

Referring now to FIG. 14, a close-up perspective view of one embodiment of a client spacecraft propellant transfer coupling assembly 420 is shown. This client propellant transfer coupling assembly 420 includes three propellant transfer couplings 422, which are coupled to and extend from an outer bracket 424. The outer bracket 424 is coupled to a support beam 426 that extends out from the client spacecraft 428. Propellant lines 430 are coupled to the propellant transfer couplings 422, which extend through the support beam 426 and to propellant tanks (not shown) within the client spacecraft. A stabilizing thruster 432 is also located in the vicinity of the support beam 426 and to the propellant lines 430. The stabilizing thruster 432 is used to stabilize the client spacecraft during various operations.

Figure 15:
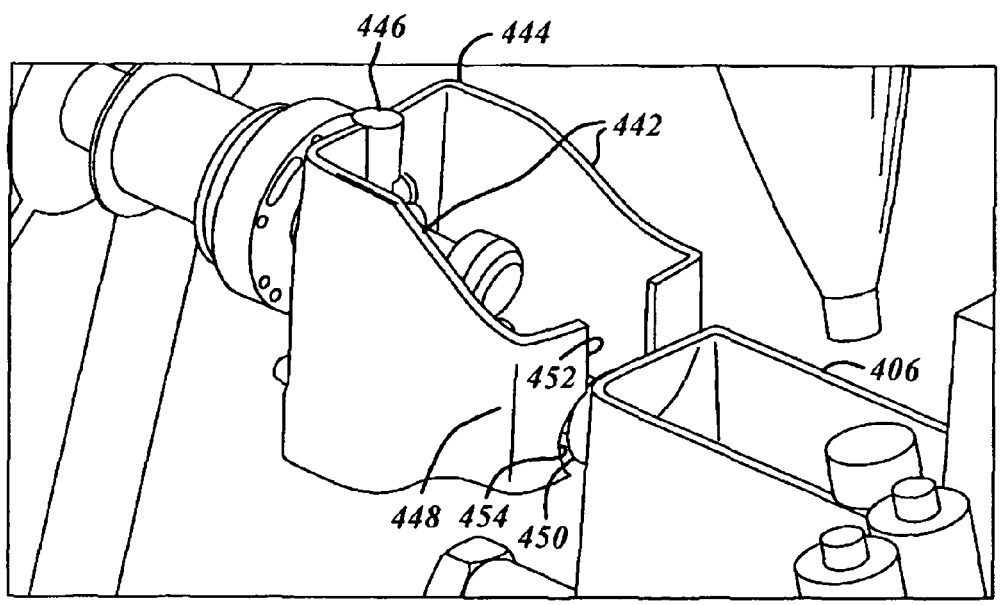
FIG. 15 is a close-up view of a propellant transfer line bracing tool in accordance with an embodiment of the present invention.

Referring now to FIG. 15, a close-up view of a propellant transfer line-bracing tool 448 in accordance with an embodiment of the present invention is shown. The propellant line-bracing tool 448 has a "jaw" like design and includes a pair of side brackets 442 that are coupled on a first end 444 via a hinge 446. The brackets 442 are moved into position to extend along side one of the propellant transfer couplings in the client propellant transfer assembly, such as the propellant transfer couplings 422 in FIG. 14, and are rotated inward to grasp a propellant transfer coupling. A single client propellant transfer coupling 450 is shown. As the brackets 442 are rotated inward its ends are placed between the propellant transfer coupling 450 and the outer bracket 406. Each of the side brackets 442 has an inner edge 452 with a semi-circular cutout portion 454. As the brackets 442 are brought together the semi-circular portions 454 (only one is shown) form a circular opening which encircles a client propellant transfer coupling. The diameter of the opening provides a tight fit on the diameter of the propellant transfer coupling 450, thereby preventing the line-bracing tool 448 from being pushed away from the propellant transfer coupling 450 during the propellant transfer process. During propellant transfer the servicing spacecraft propellant transfer system, such as the robotic arm propellant transfer system 390 shown in FIG. 12, may be subject to high back-pressures. The propellant transfer line bracing tool 448 helps withstand these back pressures and prevents the propellant transfer system from detaching or becoming dislodged or separated from the client propellant transfer assembly.

The present invention provides a servicing vehicle that is specialized to meet various client spacecraft requirements. The present invention also provides a technique of converting a non-cooperative vehicle into a fully cooperative vehicle and is compatible with spin stabilized and body stabilized spacecraft. The universal docking adaptors of the present invention are lightweight and reconfigurable to accommodate different spacecraft.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An in-space spacecraft servicing system for performing multiple client spacecraft servicing missions comprising:
    a servicing spacecraft having a guidance navigation and control system for independent flight operation during a client spacecraft servicing mission, and a servicing propulsion system including a servicing propellant tank for holding propellant to be used by the servicing propulsion system for enabling its independent flight operation, and
    a propellant module having a multi-mission propulsion system including at least one propellant tank for holding sufficient propellant to be used by the multi-mission propulsion system and the servicing propulsion system, and a docking system for docking said service spacecraft on said propellant module and for releasing the service spacecraft for independent flight operation during a client spacecraft servicing mission,
    wherein said servicing spacecraft further comprises a propellant transfer servicing system for transferring propellant from its propellant tank to a propellant tank of a client spacecraft, said propellant transfer servicing system comprising a robotic arm having multiple sections that are pivotably coupled to each other in series, a distal section of said multiple sections having a propellant transfer coupling end for coupling with a propellant transfer coupling of said client spacecraft, said robotic arm comprising a first motor that drives pivoting of said distal section relative to a next section of said multiple sections, said next section and said distal section being pivotably coupled to each other, and further comprises a second motor that drives pivoting of said next section relative to another section of said multiple sections, said next section and said another section being pivotably coupled to each other, and a controller for controlling the operation of said first and second motors and the transfer of propellant from said propellant tank of said servicing spacecraft to said propellant tank of said client spacecraft via said propellant transfer coupling end of said distal section of said robotic arm when said propellant transfer coupling end of said distal section of said robotic arm is coupled to said propellant transfer coupling of said client spacecraft.

2. A system as in claim 1, wherein said propellant module and said servicing spacecraft are moved together between a plurality of client spacecraft positions on multiple client spacecraft servicing missions by moving the two units docked together into proximity of each client spacecraft in turn and releasing the service spacecraft from the propellant module for each client spacecraft servicing mission.

3. A system as in claim 1, wherein said propellant module has its own guidance navigation and control system, and said servicing spacecraft when docked to said propellant module operates in a power save mode wherein said propellant module performs propulsion and navigation tasks for both of said servicing spacecraft and said propellant module.

4. A system as in claim 1, wherein said servicing spacecraft when docked to said propellant module provides guidance navigation and control for moving both of said servicing spacecraft and said propellant module together.

5. A system as in claim 1, wherein said propellant module has its own guidance navigation and control system, and maintains the propellant module in a stable orbital path in proximity to a client spacecraft when the servicing spacecraft is released therefrom to perform a client spacecraft servicing mission.

6. A system as in claim 1, wherein said servicing spacecraft has a communication system for communicating with said propellant module and not with any ground tracking system.

7. A system as in claim 1, wherein said servicing spacecraft has a communication system for communicating with a ground tracking system.

8. A system as in claim 1, wherein said servicing spacecraft has a universal docking adaptor for docking with said propellant module and with a plurality of client spacecraft.

9. A system as in claim 8, wherein said universal docking adaptor comprises a plurality of coupling members outwardly extendable to a plurality of positions of different diameters.

10. A system as in claim 8, wherein said universal docking adaptor has a telescoping boom extendable from the servicing spacecraft.

11. A system as in claim 8, wherein said universal docking adaptor is formed with a dual-function coupling adaptor system having a first adaptor that is extended from the servicing spacecraft to be fastened onto a surface of a non-cooperative client spacecraft that lacks a usable docking interface, and a second adaptor coupled to the servicing spacecraft that is adapted to engage with the first adaptor for docking, whereby the universal docking adaptor is used to convert a non-cooperative client spacecraft to a cooperative client spacecraft that has a usable docking interface.

12. A system as in claim 8, wherein said universal docking adaptor is provided with a propellant transfer coupling that is connected with a propellant transfer line of said propellant module on redocking.

13. A system as in claim 8, said universal docking adaptor includes at least another component selected from the group consisting of: (i) an adjustable adaptor for coupling to different client spacecraft; (ii) airbags for cushioning contact with a client spacecraft; (iii) pivoting arms for engaging an adaptor ring of a client spacecraft; (iv) an expandable mechanism for expanding within and coupling to an adaptor ring; (v) a telescoping boom for extension toward a client spacecraft; (vi) a client spacecraft thruster probe; and (vii) a cooperative docking attachment for fastening onto a surface of a non-cooperative client spacecraft that lacks a usable docking interface to convert it a cooperative client spacecraft.

14. A system as in claim 8, wherein said universal docking adaptor is configurable to couple to spin-stabilized spacecraft and to body stabilized spacecraft.

15. A system as in claim 1 wherein said propellant transfer servicing system further comprises a self-aligning adaptor attached to said distal member of said robotic arm and comprising a pair of fork members for aligning said propellant transfer coupling end of said distal section of said robotic arm with said propellant transfer coupling of said client spacecraft.

16. A system as in claim 15 wherein said propellant transfer servicing system further comprises a line-bracing tool attached to said distal member of said robotic arm and comprising a pair of hinged side brackets with cutouts for grasping said propellant transfer coupling of the client spacecraft.

17. A method of performing multiple client spacecraft servicing missions comprising:
providing an in-space spacecraft servicing system comprising a servicing spacecraft and a propellant module docked together and movable in tandem together to a client spacecraft location;
releasing the servicing spacecraft from the propellant module in proximity to the client spacecraft location to perform a client spacecraft servicing mission;
docking the servicing spacecraft at a client spacecraft,
operating a robotic arm of the servicing spacecraft having multiple sections that are pivotably coupled to each other in series in a manner that allows a propellant transfer coupling end of a distal one of the multiple sections of the robotic arm to be moved along a nonlinear path into alignment with and fluid communication with a propellant transfer coupling of the client spacecraft, and
transferring propellant from a propellant tank of the servicing spacecraft to a propellant tank of the client spacecraft via the propellant transfer coupling end of the distal section of the robotic arm,
wherein said step of operating said robotic arm comprising activating a first motor to cause said distal section to pivot relative to a next section of said multiple sections of said robotic arm, and activating a second motor to cause said next section to pivot relative to another section of said multiple sections of said robotic arm.

18. A method as in claim 17, wherein multiple client spacecraft servicing missions are performed according to a servicing methodology selected from the group consisting of: (i) redocking and moving the propellant module and the servicing spacecraft together between each of a plurality of client spacecraft locations; (ii) redocking the servicing spacecraft with the propellant module after a client spacecraft servicing mission that includes moving to more than one client spacecraft locations; (iii) having the propellant module perform propulsion and navigation tasks when the servicing spacecraft and propellant module are docked together; (iv) having the servicing spacecraft perform propulsion and navigation tasks when the servicing spacecraft and propellant module are docked together; (v) having a remote ground control perform propulsion and navigation tasks when the servicing spacecraft and propellant module are docked together; (vi) having the servicing spacecraft provided with a universal docking adaptor for docking with the propellant module and a plurality of different client spacecraft; and (vii) having the servicing spacecraft refill a client spacecraft propellant tank.

19. A method as in claim 17, further comprising coupling said propellant transfer coupling end of said distal section of said robotic arm to said propellant transfer coupling of said client spacecraft after alignment and before propellant transfer.

20. A method of resupplying propellant to a client spacecraft in space using a servicing spacecraft, comprising the following steps:
docking the servicing spacecraft at the client spacecraft;
operating a robotic arm of the servicing spacecraft having multiple sections that are pivotably coupled to each other in series in a manner that allows a propellant transfer coupling end of a distal one of the multiple sections of the robotic arm to be moved along a nonlinear path into alignment with and fluid communication with a propellant transfer coupling of the client spacecraft, and
transferring propellant from a propellant tank of the servicing spacecraft to a propellant tank of the client spacecraft via the propellant transfer coupling end of the distal section of the robotic arm,
wherein said step of operating said robotic arm comprising activating a first motor to cause said distal section to pivot relative to a next section of said multiple sections of said robotic arm, and activating a second motor to cause said next section to pivot relative to another section of said multiple sections of said robotic arm.

* * * * *